United States Patent
Luchini et al.

(10) Patent No.: US 7,386,412 B2
(45) Date of Patent: Jun. 10, 2008

(54) INTEGRATED TRANSDUCER DATA SYSTEM

(75) Inventors: John R. Luchini, Findlay, OH (US); Mark J. Basinger, McComb, OH (US)

(73) Assignee: Cooper Tire & Rubber Co., Findlay, OH (US)

( * ) Notice: Subject to any disclaimer, the term of this patent is extended or adjusted under 35 U.S.C. 154(b) by 0 days.

(21) Appl. No.: 11/284,739

(22) Filed: Nov. 21, 2005

(65) Prior Publication Data

US 2006/0136166 A1  Jun. 22, 2006

Related U.S. Application Data

(60) Provisional application No. 60/639,348, filed on Dec. 21, 2004.

(51) Int. Cl.
  *G06F 19/00* (2006.01)
(52) U.S. Cl. ...................................... 702/118; 709/213
(58) Field of Classification Search ................. 702/126, 702/182–185, 117, 118, 188; 324/76.11; 709/213
  See application file for complete search history.

(56) References Cited

U.S. PATENT DOCUMENTS

| | | |
|---|---|---|
| 4,630,470 A | 12/1986 | Brooke et al. |
| 4,964,299 A | 10/1990 | Maier et al. |
| 4,986,118 A | 1/1991 | Pottinger |
| 4,986,119 A | 1/1991 | Gicewicz |
| 5,016,470 A | 5/1991 | Himmler |
| 5,186,042 A | 2/1993 | Miyazaki |
| 5,341,687 A | 8/1994 | Stan |
| 5,396,817 A | 3/1995 | Rosensweig |
| 5,522,144 A | 6/1996 | Smoorenburg |
| 5,812,553 A | 9/1998 | Pinault et al. |
| 5,817,951 A | 10/1998 | Cook et al. |
| 6,006,597 A | 12/1999 | Miyazaki |
| 6,324,919 B1 | 12/2001 | Larsen et al. |
| 6,332,359 B1 | 12/2001 | Ueyanagi et al. |
| 6,536,292 B1 | 3/2003 | Clark et al. |
| 6,798,226 B2 | 9/2004 | Altmann et al. |
| 6,825,788 B2 | 11/2004 | Wouters |
| 6,845,672 B2 | 1/2005 | Mol et al. |
| 2006/0025897 A1* | 2/2006 | Shostak et al. ................. 701/1 |
| 2006/0034726 A1* | 2/2006 | Sunshine et al. .............. 422/58 |
| 2006/0062091 A1* | 3/2006 | Lenz et al. ................ 369/13.25 |

FOREIGN PATENT DOCUMENTS

EP  0 656 269 B1  9/1997

* cited by examiner

*Primary Examiner*—Edward Raymond
(74) *Attorney, Agent, or Firm*—Emch, Schaffer, Schaub & Porcello Co. L.P.A.

(57) ABSTRACT

An improved sensor module assembly to be used in an array for measuring the distribution of forces, displacements, or temperatures or other physically measurable quantity of an article being tested or measured. A programmable digital processor is installed at each sensor and connected between transducers and a digital bus. This integrated transducer digital processor can send data as high fidelity, digital signals with commensurately low noise to another digital processor. The integrated transducer digital processor can also send and receive other digital information, allowing communication of commands and data among processors, including a larger, centralized, digital processor which may be employed to read and store the digital data signals.

21 Claims, 4 Drawing Sheets

INTEGRATED TRANSDUCER DATA SYSTEM

CROSS REFERENCE

The present patent application is based upon and claims the benefit of provisional patent application No. 60/639,348 filed Dec. 21, 2004.

BACKGROUND OF THE INVENTION

In performing measuring and/or testing, it is frequently necessary to have a plurality of sensors secured to numerous sites of the article being measured or tested in order to obtain data from such sites. Typically in the prior art, a system which utilized a plurality of sensors for obtaining information utilized a plurality of transducers and each transducer required that a plurality of wires be connected from each transducer to a plurality of transducer indicators.

For clarity in this document, the term "sensor" is used for a device that is responsive to changes in an input quantity by providing a proportional output, typically for the purpose of measurement. In addition, the term "transducer" is used for a device for converting an input energy to an output energy, typically used for converting from one form of energy into another form of energy for the purpose of measurement. Thus, a spring scale is a sensor that converts input mechanical force into a mechanical displacement that may be read on a linear scale; a transducer used with the sensor can convert the input mechanical energy to an output electrical signal.

The large number of wires had to be manually connected to carry the signals to the transducer indicators. The bulky and unyielding array of wires required for transmission of data from the sensors to the indicators, for example electromechanical meters or computer channels, created the potential for multiple forms of data transmission errors (i.e. noise) and/or channel failure (i.e. lack of signal). For example, if a testing system had ten sensors and nine wires were required from each sensor and its associated transducers, such system would require ninety wires for transmission of data obtained therefrom.

SUMMARY OF THE INVENTION

The present invention relates to an improved sensor module assembly that can be implemented in an array for measuring forces, deformations, temperatures, or the like (i.e. stress, strain, energy). More particularly, the present invention relates to an improved sensor module assembly to be used in an array for measuring the distribution of physically measurable quantities of the article being tested or measured, such as those generated in the footprint of a tire.

Under the present invention, a programmable digital processor is installed at each sensor and connected between transducers and a digital bus. This integrated transducer digital processor can send data as high fidelity, digital, signals with commensurately low noise to another digital processor. The integrated transducer digital processor can also send and receive other digital information, allowing communication of commands and data among processors, including a larger, centralized, digital processor which may be employed to read and store the digital data signals.

According to the present invention the system will utilize a "network cable" for a digital bus, typically containing about 8 wires, irrespective of the number of transducers or other sensors, utilized. A digital processor, used as a digital transducer transponder, mounted with the sensors will put the processed information onto a bus to be picked up by another digital processor on the bus.

Accordingly, it is an object of the present invention to provide a system for efficiently sensing and receiving data from or about an article being tested, and storing and transmitting such data.

Other objects and advantages of the present invention will become apparent to those skilled in the art upon a review of the following detailed description of the preferred embodiments and the accompanying drawings.

DETAILED DESCRIPTION OF THE PREFERRED EMBODIMENT(S)

Figure 4A:
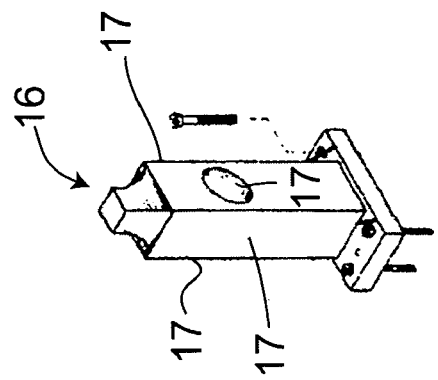
FIG. 4A is perspective of a sensor of the assembly of FIG. 4.
Figure 4:
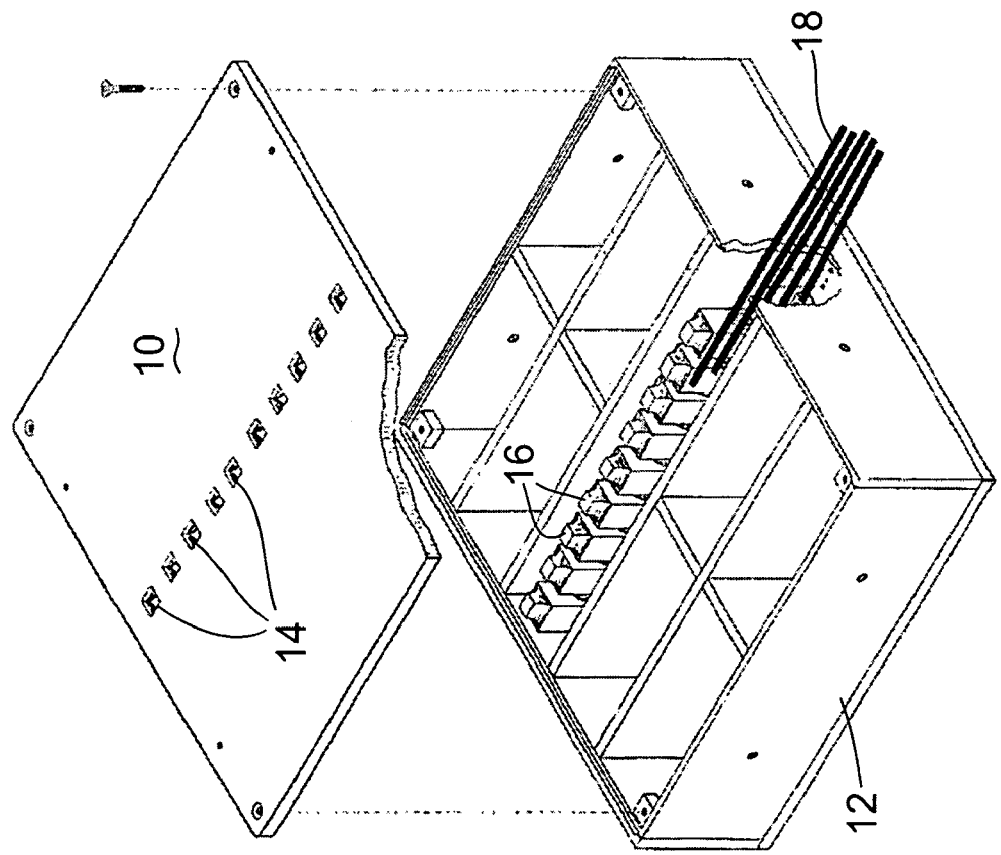
FIG. 4 is a perspective view of a prior art NASA Tire Test Transducer Assembly showing a schematic representation of a portion of a footprint pressure machine illustrating one use for the system of the present invention.

Referring first to FIG. 4 there is shown a plate 10 (NASA ref drawing LD-943428) for the loading of a tire against a sensor assembly within a loading frame 12. The plate 10 is part of an assembly mounted on a tire loading frame 12. As shown the plate has ten holes 14. A plurality of sensors 16 are positioned in the loading frame with one sensor 16 being positioned in each of the ten holes 14. Each of the sensors 16 has three or four locations 17 (see FIG. 4A) for application of transducers for receiving mechanical data such as forces, stresses, pressures, displacements, strains, and thermal data such as surface temperatures. The sensors will sense mechanical data, respectively, from the x-axis, y-axis and z-axis, and (optionally) temperature. According to the prior art utilizing wires to transmit the data, a bundle 18 of more than eighty wires is required to transmit data from the ten sensors 16, each having three or four transducers attached thereto. This provides multiple opportunities for electromagnetic (EM) noise to enter the analog signal wires and for lost data due to intermittent or broken connections that are inherent in such type of testing unit.

Figure 1:
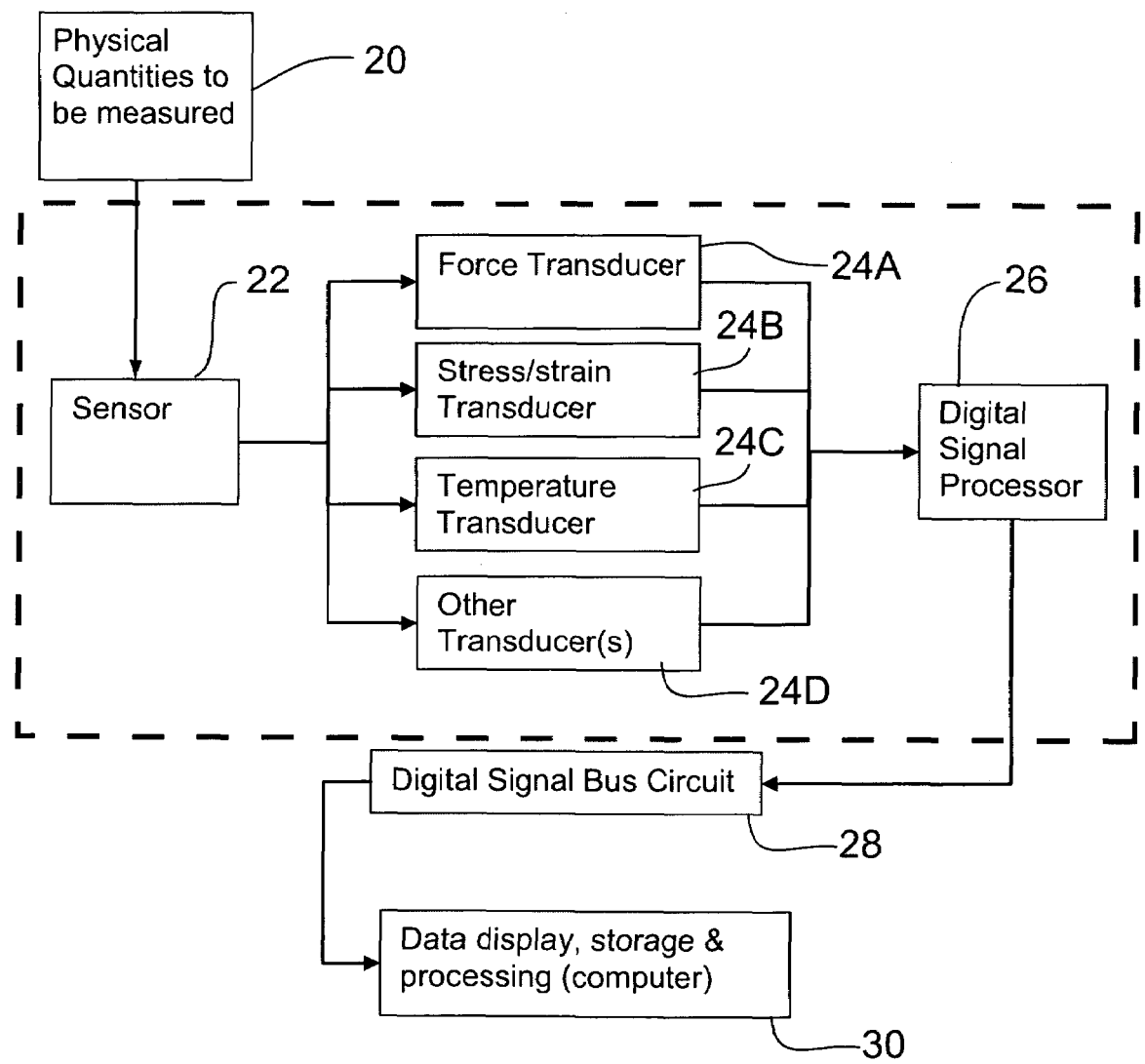
FIG. 1 is a block diagram showing a general representation of the flow of information from the article being tested to data display, storage and processing (DDSP) through one element of the Integrated Transducer System, and highlighting the entity that integrates the sensor, transducer, and digital processor.

Referring to FIG. 1, there is shown a block diagram of the system of the present invention, with the (dashed) box enclosing items 22-26 illustrating the integration of the transducer with the digital signal processor. Block 20 represents the article for which various physical quantities are to be measured. In the case of a footprint machine described with respect to FIG. 4, the article will be a tire; however, the present invention is suitable for measuring physical characteristics of a wide variety of articles. Accordingly, it may be used in a wide variety of industries outside the tire industry. A block number 22 represents one of a plurality of sensors which will be mounted to contact the article being measured in order to sense a variety of factors. As such, it is responsive to input quantities, for example varying pressures applied to the article 22 along various axes. For example, in the footprint machine, each sensor can receive data as the tire is subjected to a variety of pressures applied to it. Such pressures can result in forces being created in the x-axis, the y-axis and the z-axis. A plurality of transducers are provided for the sensors. These are represented by boxes labeled 24A for force transducer, 24B for stress/strain transducer, 24C for temperature transducer and 24D for other transducers. Thus, in the example of FIG. 1, for each sensor 22 there may be one to four or more transducers for receiving different items of data from such sensor. Sensors which are utilized may be any of a variety of commercially available sensors such as load cells, thermocouples, and thermistors, or custom fabricated sensors, for example, those described in Pottinger U.S. Pat. No. 4,986,118 or in Richards and Clark U.S. Pat. No. 6,536,292 may be utilized.

Each of the transducers 24A, 24B, 24C and 24D converts the sensor responses to electrical signals which are transmitted to a digital processor represented by the box labeled 26. A digital processor 26 may be one such as manufactured by Analog Devices, Inc. under its part numbers ADu845xxx or ADuC847xxx. The digital processor 26, or a Microprocessor Control Unit (MCU), converts the analog electrical signals received from the transducers to digital signals. The digital processor 26 forwards the digital information to a digital signal bus circuit represented by block 28 which transmits the data to a DDSP computer represented by block 30 for data display, storage and processing. The digital signal bus circuit 28 can be a standardized communication network protocol bus or circuit such as Controller Area Network (CAN) or RS485 in which case, the interface between the digital processor and the digital signal bus may be moderated by an integrated or separate circuit within the integrated transducer, such as the electronic components "MAX3089E," RS485 chip made by Maxim Integrated Products or a CAN controller chip set "MCP2515" used in conjunction with a transceiver chip "MCP2551" made by Microchip Technology Inc.

Figure 2:
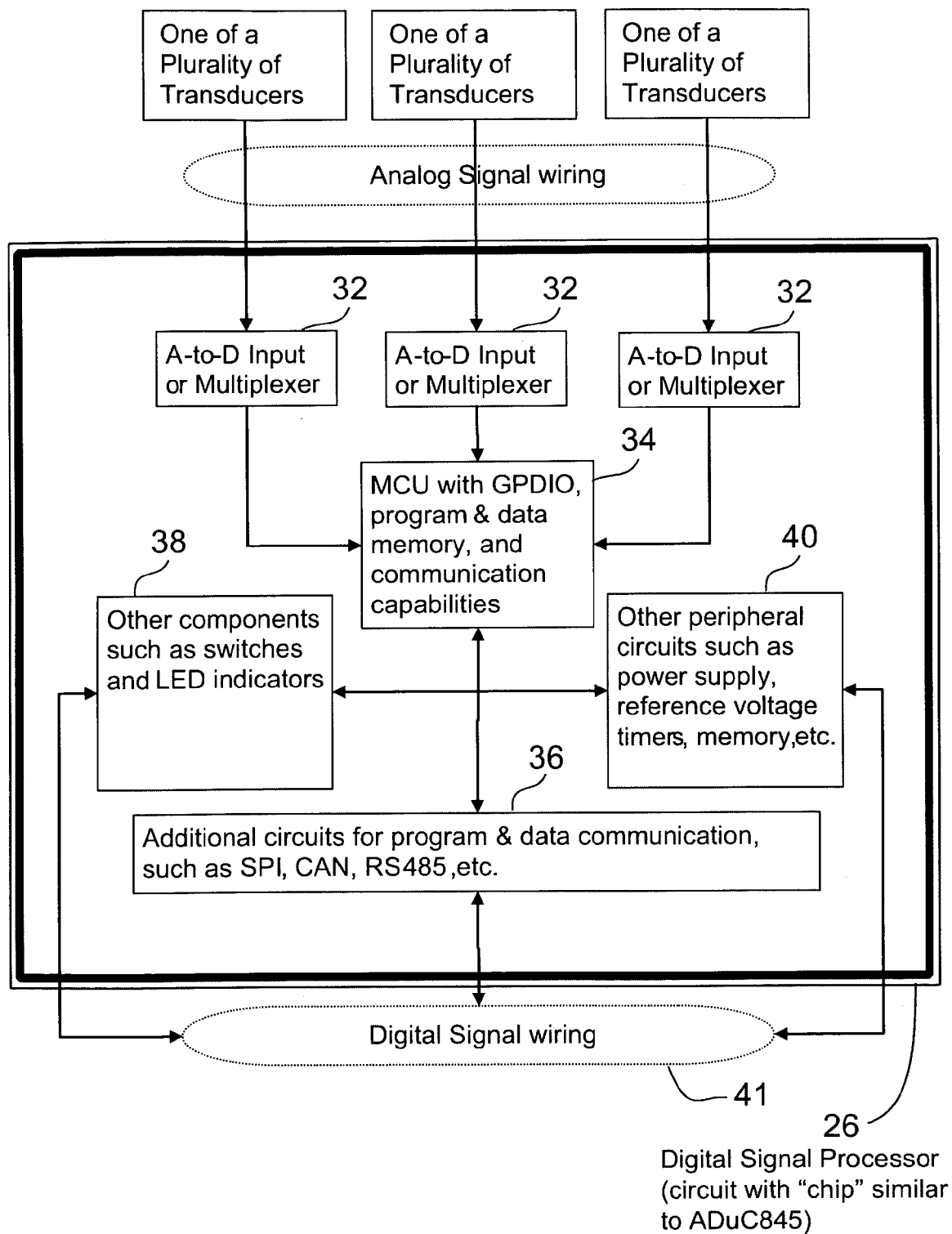
FIG. 2 is a block diagram showing the processing of data to the digital signal processor and to the digital signal wiring/bus circuit, expanding the representation of the digital processor and identifying the transition from analog wiring to digital wiring.

Referring to FIG. 2 there is shown schematically an expanded view of a digital signal processor 26 and its interrelationship with the various transducers. (NOTE: there was a box around 32-34-36-38-40 that is to be identified as the DSP 26. The version of FIG. 2 sent with the document showed the label but not the box to be identified.) As shown in FIG. 2 each of the transducers sends an analog signal to an analog to digital (A-to-D) input or multiplexer represented by blocks identified by the numeral 32. Each A-to-D input or multiplexer 32 forwards the data to a Microprocessor Control Unit (MCU) with General Purpose Digital Input Output (GPDIO) program and DATA MEMORY represented by the box 34. Such program and data memory has communication capabilities for forwarding data to such additional circuits 36 for program and data communications as may be desired. These additional circuits 36 for program and data communication can include Serial Peripheral Interface (SPI), CAN, RS-485 among others. These additional circuits for program and data communication direct data to the digital signal processor 26. From the digital signal processor 26 the data is transmitted to wiring 41 for the digital signal bus circuit 30. Other components such as switches and light emitting diode (LED) indicators, represented by box 38, and other peripheral circuits such as power supply, reference voltages, timers, memory and the like, represented by box 40, also forward information to the digital signal wiring 41.

Figure 3:
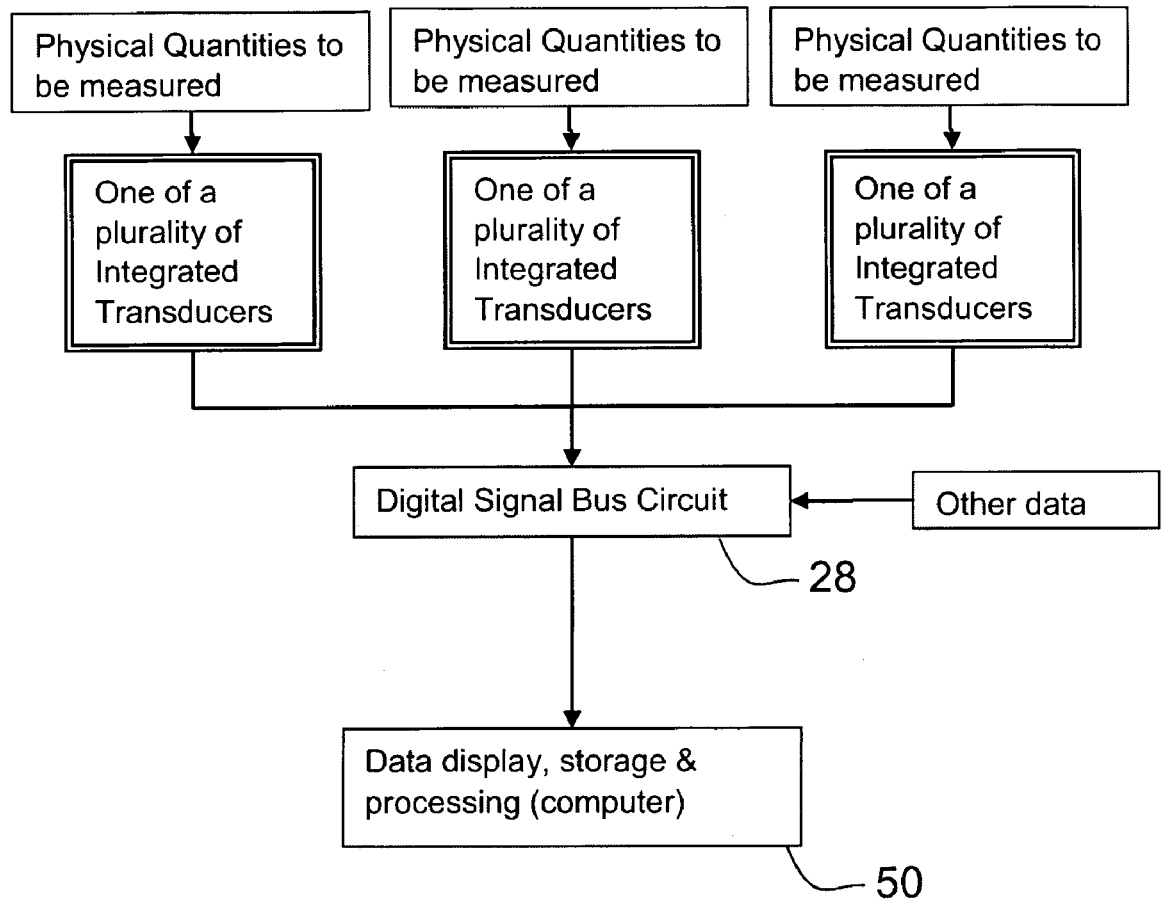
FIG. 3 is a block diagram showing the flow of information from a plurality of integrated transducers to a common digital bus circuit.

Referring to FIG. 3 there is shown a block diagram showing the common digital signal bus circuit 28 and means for conducting the digital signals from the integrated transducers to the digital signal bus circuit 28 and then to another computer 50 for storage or further processing.

The source of the data that is transferred along the digital signal bus circuit 28 must be identified and tracked so the information can be processed by the data display, storage & processing (DDSP) computer 50. In addition to common and standardized protocols, it is a feature of the invention that special codes can be used to identify the specific sensor sending the data. The coding can include a transducer or channel code from the identified sensor and a time code indicating when the original data was obtained from the transducer. These codes enable an arbitrarily large amount of data to be stored at the integrated transducers for delayed transfer on the digital bus. The delay described here may be on the order of nanoseconds to days, and may be adjustable based on the needs of the specific application for the integrated transducer.

The capabilities of the integrated transducers provides the opportunity for a variety of signal processing to be done within the MCU. It will be understood by those skilled in experimental data collection and processing that there are several optional and required mathematical operations used to convert the transducer signals to useful information. With the present invention, these mathematical operations may be done after the data is collected and stored or as it is collected efficiently within the MCU of the integrated transducers. These operations are summarized here as arithmetic, algebraic, and statistical functions. Typical arithmetic functions are addition/subtraction or "zero offset" and multiplication/division or "scaling." Typical algebraic functions would be used for "thermocouple linearization" or linearized scale adjustments based on transducer range changes. Typical statistical functions would be used following collection of a quantity of data to report an average, range, or variance as well as performing mathematical filtering (e.g. 4-pole Butterworth) or Fourier Transforms for frequency analysis. It will be clear that performing these standard signal processing functions at the integrated transducers will reduce the amount of data that must be transferred to the DDSP computer 50. The reduction in data transfer can permit more transducers to use the digital bus and effect an increase in speed for data being transferred to the DDSP computer.

The above detailed description of the present invention is given for explanatory purposes. It will be apparent to those skilled in the art that numerous changes and modifications can be made without departing from the scope of the invention. Accordingly, the whole of the foregoing description is to be construed in an illustrative and not a limitative sense, the scope of the invention being defined solely by the appended claims.

We claim:

1. A system for integrating a sensor, transducers, and a digital processor comprising:

a sensor that is responsive to changes in input forces, temperature, or other physical quantity;

one or more transducers integrated with said sensor to convert the sensor responses to analog electrical signals;

conductors carrying said analog electrical signals from said transducers to a digital signal processor, said digital signal processor converting said analog electrical signals to digital signals, said transducers being connected to and integrated with the digital signal processor;

a digital bus circuit for receiving said digital signals; and means included with said digital signal processor for placing data from said sensor onto said digital bus circuit with coded identification of the sensor or transducer supplying the data or the time the data was collected, said digital signal processor including means for placing data from the analog electrical signal of said sensor onto said bus circuit after modification of the digital data for zero offset by addition or subtraction of an input or computed offset of zero or more.

2. A system according to claim 1, wherein said bus circuit utilizes a standardized communication network protocol.

3. A system according to claim 1 wherein said digital signal processor includes means for placing data from the analog electrical signal of said sensor onto said bus circuit after modification of the digital data for linearity.

4. A system according to claim 3 wherein said means includes a digital representation of a function, said function including a thermocouple linearization function or a computed function.

5. A system according to claim 4 wherein said computed function is based upon mathematical or statistical analysis of said digital data.

6. A system according to claim 1 further including a plurality of digital bus circuits connected to said integrated transducers, a plurality of digital signal processors, a digital bus circuit connected to each of said digital signal processors with means for conducting the digital signals from the digital bus circuit of said integrated transducers to another computer for storage or further processing.

7. A system according to claim 1 further including means for conducting the digital signal processor output to a communication or display device, said means including a digital bus circuit.

8. A system for integrating a sensor, with one or more transducers, together with a digital processor comprising:
a single sensor that is responsive to changes in input forces, temperature, or other physical quantity;
one or more transducers, integrated with said sensor, that convert the sensor responses to analog electrical signals;
a digital signal processor integrated with the integrated sensor-transducers; and
means included with said digital signal processor for converting the analog electrical signals to digital signals and for placing data from said sensor onto a digital bus circuit with coded identification of the sensor or transducer supplying the data,
said digital signal processor including means for placing data from the analog electrical signal of said sensor onto said bus circuit after modification of the digital data for zero offset by addition or subtraction of an input or computed offset of zero or more.

9. A system according to claim 8 wherein said bus circuit is a standardized communication network protocol.

10. A system according to claim 9 wherein said standardized communication protocol is a member selected from the group consisting of a controller area network (CAN) chip and an RS485 chip.

11. A system according to claim 8 wherein said digital signal processor includes means for placing data from the analog electrical signal of said sensor onto said bus circuit after modification of the digital data for linearity.

12. A system according to claim 8, wherein said digital signal processor includes a digital representation of a function, said function including a thermocouple linearization function or a computed function.

13. A system according to claim 12, wherein said computed function is based upon mathematical or statistical analysis of said digital data.

14. A system according to claim 8, further including a plurality of digital bus circuits each connected to one of a plurality said integrated transducers, a digital bus circuit connected to each of said digital signal processors with means for conducting the digital signals from the digital bus circuit to a computer for storage or further processing.

15. A system according to claim 8 further including a digital bus circuit for conducting the digital signal processor output to a communication or display device.

16. A system for integrating a sensor, transducers, and a digital processor comprising:
a sensor that is responsive to changes in input forces, temperature, or other physical quantity;
one or more transducers integrated with said sensor to convert the sensor responses to analog electrical signals;
conductors carrying said analog electrical signals from said transducers to a digital signal processor, said digital signal processor converting said analog electrical signals to digital signals, said transducers being connected to and integrated with the digital signal processor;
a digital bus circuit for receiving said digital signals; and
means included with said digital signal processor for placing data from said sensor onto said digital bus circuit with coded identification of the sensor or transducer supplying the data or the time the data was collected,
said digital signal processor including means for placing data from the analog electrical signal of said sensor onto said bus circuit after modification of the digital data for scale by multiplication or division of an input or computed scale factor of one or more.

17. A system according to claim 16 wherein said digital signal processor includes a digital representation of a function, said function including a thermocouple linearization function or a computed function.

18. A system according to claim 17 wherein said computed function is based upon mathematical or statistical analysis of said digital data.

19. A system according to claim 16 further including a plurality of digital bus circuits connected to said integrated transducers, a plurality digital signal processors, a digital bus circuit connected to each of said digital signal processors with means for conducting the digital signals from the digital bus circuit of said integrated transducers to another computer for storage or further processing.

20. A system according to claim 16 wherein said bus circuit is a standardized communication network protocol.

21. A system according to claim 16 wherein said digital signal processor includes means for placing data from the analog electrical signal of said sensor onto said bus circuit after modification of the digital data for linearity.

* * * * *